Aug. 8, 1944.    J. BROWN    2,355,507
BEARINGS FOR ROLLING MILLS, MIXERS, AND CALENDERS
Filed Jan. 20, 1943
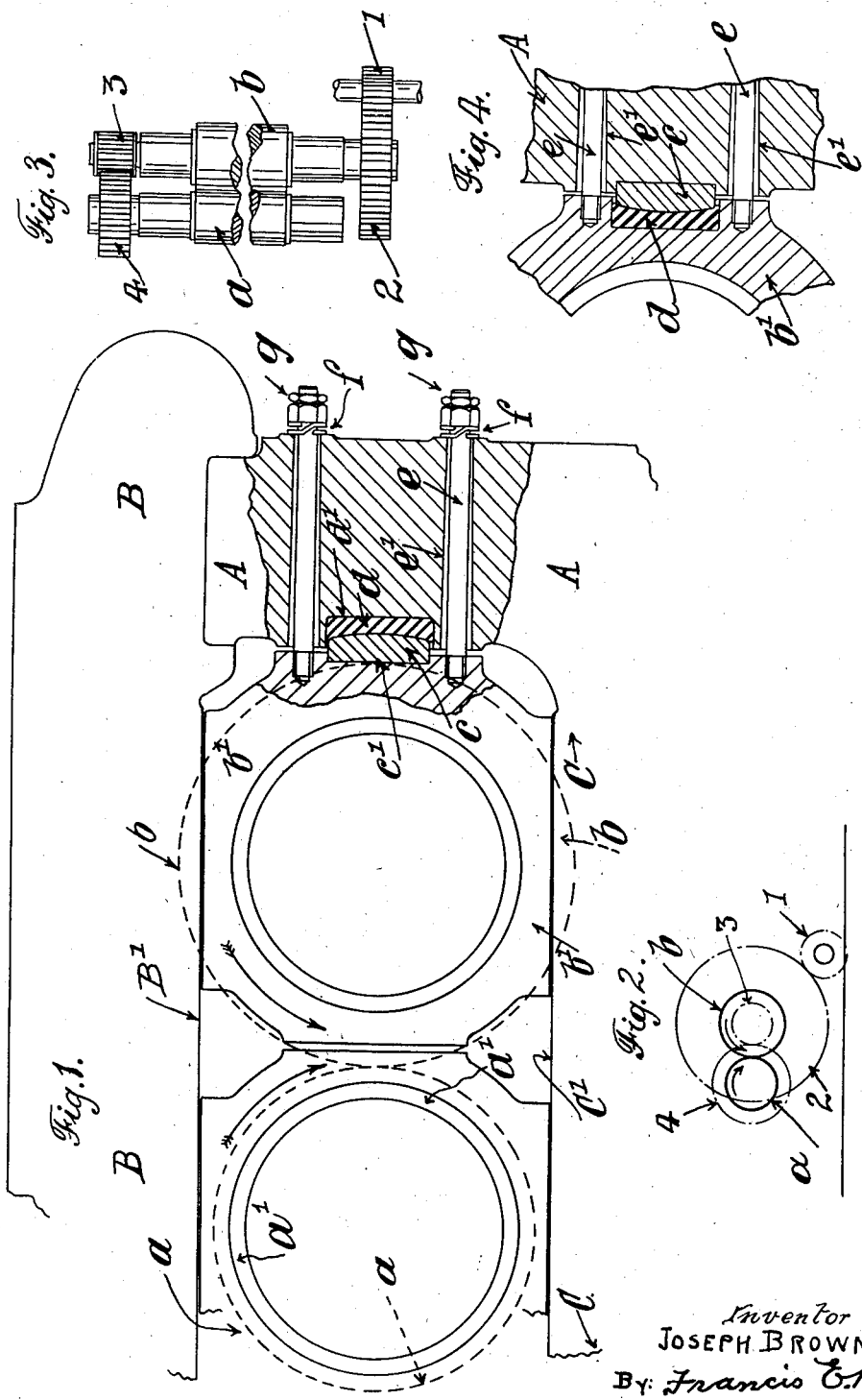
Inventor
JOSEPH BROWN
By: Francis E. Boyer
ATTORNEY.

Patented Aug. 8, 1944

2,355,507

UNITED STATES PATENT OFFICE 2,355,507

BEARINGS FOR ROLLING MILLS, MIXERS, AND CALENDERS

Joseph Brown, Castleton, Rochdale, England, assignor to David Bridge & Company Limited, Castleton, Rochdale, England, a British company Application January 20, 1943, Serial No. 472,942
In Great Britain February 12, 1942

3 Claims. (Cl. 308—72)

This invention relates to improvements connected with the bearings of rolling mills, mixers, calenders, or such like apparatus for working or mixing or acting upon rubber or rubber mixtures, re-claimed rubber masses, linoleum masses, plastics, and such like, wherein the mass or product is acted upon between opposing rollers which are driven through gears and rotate to the direction of the nip.

The bearings and shaft for one roller, for convenience called the front roller, are free to move or have power of accommodation, but the bearing blocks or structures including the blocks or housings, brasses, shaft etc., for the other roller, for convenience called the back or anchored roller, have no power of accommodation.

It is found in practice that in passing unusually hard or heavy masses between the rollers (which are usually driven by very powerful gearing one set from another) that whilst the bearing blocks or structures for the front roller do not develop undue heat, the bearing blocks or structures for the back or anchored roller develop very considerable heat, and said bearing blocks or structures, and the roller, shafts or axles, wear rapidly and soon become unsatisfactory.

It is considered that the excessive wear set-up with respect to the bearing blocks or structures of said back or anchored roller in this class of apparatus, is due to the fact that the bearing blocks or structures for said back roller have no power of accommodation and are unable to adjust themselves either together or relatively.

Therefore according to this invention, it is proposed to provide bearing blocks or structures (for the back or anchored roller of the class of machines indicated) which shall be so fashioned, mounted and anchored as to furnish them with power of accommodation.

Thereby said bearing blocks or structures together with the rollers, shafts or axles, can make compensating or accommodating movement to meet very severe stresses at any particular time due to passage of an unusually heavy load or hard mass or to deflection of the rollers.

Such being the purpose of the invention, the construction of the accommodating bearing blocks or structures and the mere manner of mounting, will vary according to the particular class of machine, but same is in all cases of an order which permits, when required, of very slight angular and sliding or compensating movement thereof, with power of recovery, each bearing block or structure being accommodatingly tied or anchored to the cheek or frame of the machine against excessive movement and for retracting purposes.

According to the invention the power of accommodation in respect of such bearing blocks or structures, for the back rollers of machines of the type specified herein, is obtained by the use of resilient media applied between the rear ends of the bearing blocks or structures and the cheeks or framework or other appropriate part of the framework of the machine, such resilient media being advantageously in the nature of a housed or enveloped rubber composition block or blocks. The back of each bearing block or structure is provided with plunger-like means to co-operate with the rubber composition block or blocks. The disposition of the plunger-like means and the rubber composition block or blocks, may be reversed. Tie-bolts of an accommodating character are also made use of.

The purpose of such tie-bolts is to anchor the bearing blocks or structures to the cheek, frame, standard, or other part which forms the rear abutment to each bearing block or structure and for the purpose of retracting the latter when normal conditions are restored.

The accompanying drawing illustrates approved arrangements according to the invention conforming with the foregoing, and in the drawing:

Fig. 1 is an end view, partly in section, showing one arrangement of the various features.

Fig. 2 shows a diagram of a typical gear drive for an arrangement of rollers such as illustrated by Fig. 1.

Fig. 3 is a diagrammatic plan view of the gear drive shown by Fig. 2.

Fig. 4 is a broken view showing a modified arrangement. In Fig. 1 part of the frame providing the cheeks is marked A, the cap on such frame which is an easy fit, is marked B, and the body of the slide for the bottom of the bearing blocks or structures is marked C. The front or adjustable roller is marked $a$ and each bearing block or structure is furnished with the usual brasses marked $a^1$. Each bearing block or structure is slidably mounted between the slide surfaces $C^1$, $B^1$ provided in connection with the frame-work A and cap B.

Respecting the back roller to which the improvements apply, this is marked $b$ and has its shaft or axle ends supported in the bearing brasses of the bearing blocks or structures $b^1$. Each bearing block or structure $b^1$ is movably mounted between the slide surfaces $C^1$, $B^1$, and there is a slight clearance between the top of the bearing block and the under face $B^1$ of the frame or cap B to permit slight angular movement. Each bearing block or structure $b^1$ has its rear face formed with a rounded projection, and advantageously with a plunger $c$ with curved face, the plunger being shown as let-into an annular recess $c^1$ machined in the rear wall of the bearing block or structure $b^1$. This plunger $c$ bears upon the resilient medium, a rubber composition block $d$ best serving the required purpose. Said rubber block $d$ can be well supported by locating same in a cavity or housing such as $d^1$ fashioned in the cheek of the frame-work A.

Thus, the rubber composition block $d$ housed or shrouded in simple manner serves as the resilient medium and protected buffer to the plunger $c$ and furnishes the necessary accommodating provision for the bearing block or structure $b^1$.

Instead of the rubber composition blocks $d$ being located in the cheeks of the frame-work A and the plunger-like devices $c$ on the bearing blocks or structures, the disposition may be reversed. Such a modified arrangement is indicated at Fig. 4.

There is also provided, in respect of each bearing block or structure $b^1$, horizontal tie-bolts (advantageously two) which serve to anchor the bearing blocks or structures $b^1$ to the cheeks or other framework A, and these are of an accommodating character and are located out of line with the centre of the resilient media. The object is to provide for adjustment and for slight anchored movement along with the bearing blocks or structures of the back roller $b$.

In Fig. 1 the tie bolts $e$ there shown are located in tapered passageways $e^1$, the inner threaded ends being screwed into the rear face of each bearing block or structure $b^1$. The ends of the tie bolts emerging on the rear face of the frame A, have very powerful springs $f$ applied thereto which can be acted upon by locknuts $g$ for setting and adjustment purposes.

The tie bolts $e$ with the springs $f$ also serve to retract the bearing blocks or structures $b^1$, so as to normally hold same with the desired space or separation from the cheeks of the frame-work A.

It is understood that the herein described accommodating provision for the bearing blocks or structures occurs with respect to each shaft or axle end of the roller $b$.

The Figs. 2 and 3 show diagrammatically a typical gear drive for rollers such as $a$, $b$. In these figures, 1 is the drive pinion, 2 the drive wheel for roller $b$, the roller $a$ being driven through the pinions 3, 4.

I declare that what I claim is:

1. Bearing structures for the purposes described, comprising a front roller and a back roller, bearing blocks therefor guided in a horizontal plane, an accommodating and angularly movable guided bearing block for each end of the shaft of the back roller, a resilient medium in the rear of each of the bearing blocks for said back roller, said resilient medium having a curved face, means to house said resilient medium, a plunger-like contrivance having a curved face cooperating with the curved face on said resilient medium, and horizontally disposed accommodating tie-bolts, tapered bolt holes therefor in the cheeks of the machine and out of line with the resilient medium, said tie-bolts as to one end engaging the bearing blocks for the back roller and having springs and lock-nuts applied to their outer ends, all whereby each bearing block for the back roller has a centralized pivot or focus of pressure, all to permit slight angular and accommodating movement of said bearing blocks for the back roller.

2. Bearing structures for mixers and such like, comprising a front roller and a back roller, bearing blocks therefor guided in a horizontal plane, accommodating and angularly movable guided bearing blocks for the shaft of the back roller, a plunger-like contrivance at the rear of each bearing block for said back roller, said contrivances having a curved face, rubber blocks co-operating with said contrivances also having curved faces, housings for said rubber blocks in the cheeks of the machine, and horizontally disposed accommodating tie-bolts located in tapered bolt holes therefor in the cheeks of the machine and disposed above and below the plunger-like contrivances and the rubber blocks, said tie-bolts being attached to the bearing blocks as to their inner ends and having springs and lock-nuts applied to their outer ends, all to permit of slight angular and accommodating movement of the bearing blocks of the back roller.

3. Bearing structures for mixers and such like, comprising a front roller and a back roller, bearing blocks therefor guided in a horizontal plane, accommodating and angularly movable guided bearing blocks for the shaft of the back roller, a housing recess in the rear of each bearing block, a rubber block located in each recess, said rubber blocks having curved faces, plunger-like contrivances having curved faces carried by the cheek of the machine and cooperating with said rubber blocks, and horizontally disposed accommodating tie-bolts located in tapered bolt holes in the cheeks of the machine and out of line with the plunger-like contrivances and the rubber blocks, said tie-bolts being attached to the bearing blocks as to their inner ends and having springs and lock-nuts applied to their outer ends, all to permit of slight angular and accommodating movement of the bearing blocks of the back roller.

JOSEPH BROWN.